(12) United States Patent
Marc

(10) Patent No.: US 7,849,631 B2
(45) Date of Patent: Dec. 14, 2010

(54) METHOD FOR AVOIDING FROST DAMAGE IN CROPS AND/OR FOR IMPROVING THE FRUCTIFICATION AT LOW TEMPERATURES AND DEVICE APPLIED WITH SUCH A METHOD

(75) Inventor: Polleunis Marc, Kortenaken (BE)

(73) Assignee: Lazo Europe, Naamloze Vennootschap, Kalmthout (BE)

( * ) Notice: Subject to any disclaimer, the term of this patent is extended or adjusted under 35 U.S.C. 154(b) by 612 days.

(21) Appl. No.: 11/724,154

(22) Filed: Mar. 15, 2007

(65) Prior Publication Data

US 2007/0220807 A1    Sep. 27, 2007

(30) Foreign Application Priority Data

Mar. 16, 2006    (BE) .................. 2006/0162

(51) Int. Cl.
    *A01G 13/06*    (2006.01)
(52) U.S. Cl. ............................................. 47/2
(58) Field of Classification Search ........ 47/2, 47/1.44, 1.5, 23.3, 19.2; 126/59.5; *A01G 13/06*
    See application file for complete search history.

(56) References Cited

U.S. PATENT DOCUMENTS

| | | | | |
|---|---|---|---|---|
| 2,658,308 A * | 11/1953 | Fowler, Jr. et al. | ............... | 47/2 |
| 2,712,714 A * | 7/1955 | McGee | ............... | 47/2 |
| 2,796,699 A * | 6/1957 | Stinson | ............... | 47/2 |
| 2,807,120 A * | 9/1957 | Graham | ............... | 47/2 |
| 2,972,208 A * | 2/1961 | Martin | ............... | 47/2 |
| 3,055,145 A * | 9/1962 | Lindsay | ............... | 47/2 |
| 3,120,949 A * | 2/1964 | Robinson | ............... | 432/223 |
| 3,243,890 A * | 4/1966 | Easterday | ............... | 34/498 |
| 3,421,494 A | 1/1969 | Perkins | | |
| 4,434,345 A * | 2/1984 | Muscatell | ............... | 219/749 |
| 4,513,529 A * | 4/1985 | Reich | ............... | 47/2 |
| 4,643,355 A * | 2/1987 | Sanders et al. | ............... | 239/2.1 |
| 5,010,872 A * | 4/1991 | Kish et al. | ............... | 126/59.5 |
| 5,285,769 A * | 2/1994 | Wojcicki | ............... | 126/59.5 |
| 5,575,109 A * | 11/1996 | Kuntz | ............... | 47/23.3 |
| 5,953,856 A * | 9/1999 | Baiamonte et al. | ............... | 47/1.44 |
| 6,182,652 B1 * | 2/2001 | Hill | ............... | 126/59.5 |
| 6,223,995 B1 * | 5/2001 | Evans et al. | ............... | 239/2.1 |
| 6,257,498 B1 * | 7/2001 | Siebol | ............... | 239/77 |
| 6,347,625 B1 * | 2/2002 | Hill | ............... | 126/59.5 |
| 6,564,508 B1 * | 5/2003 | Buchan | ............... | 47/58.1 R |
| 2005/0086858 A1 | 4/2005 | Schmidt | | |
| 2009/0077872 A1 * | 3/2009 | Faria et al. | ............... | 47/2 |

FOREIGN PATENT DOCUMENTS

GB    2 387 308 A    10/2003
NL    8 403 750    7/1986

* cited by examiner

*Primary Examiner*—Son T Nguyen
*Assistant Examiner*—Shadi Baniani
(74) *Attorney, Agent, or Firm*—Bacon & Thomas, PLLC

(57) ABSTRACT

Method for avoiding frost damage in crops (35) and/or for improving the fructification at low temperatures, characterized in that it consists in periodically heating and cooling the air on the site of the crops (35) between a minimum and a maximum temperature with a minimal temperature variation of 0.2° C.

7 Claims, 5 Drawing Sheets

METHOD FOR AVOIDING FROST DAMAGE IN CROPS AND/OR FOR IMPROVING THE FRUCTIFICATION AT LOW TEMPERATURES AND DEVICE APPLIED WITH SUCH A METHOD

The present invention concerns a method for avoiding frost damage in crops and/or for improving the fructification at low temperatures, whereby the method is designed to be applied on smaller surfaces of about 0.5 hectare, but whereby the invention is not exclusively restricted to such smaller surfaces.

It is known that serious losses are often suffered in agriculture due to crop damage caused by frost, especially in spring when flowers and buds start to form in these crops.

It is generally known that plants and crops do not necessarily freeze at 0° C.

Depending on the growth stage and the sort of plant, crops have a certain resistance against freezing.

In fruit culture, for example, a bud, depending on the sort, may have a freeze resistance to −5° C.

However, a flower typically has a freeze resistance of merely −1° C.

A first form of frost damage in crops is caused by the formation of intercellular ice.

Due to this intercellular ice formation, the volume of the plant cells increases, as a result of which the cell wall finally bursts.

Another form of frost damage is due to the formation of extracellular ice, whereby during the crystal growth of the ice around the buds or flowers, water is extracted from the plant cells, so that the cell will eventually dry out and/or the cell wall will burst.

A known method for avoiding such frost damage in crops consists in setting up small sources of heat between the crops so as to make the temperature rise where the crops are situated, up to a temperature at which the crops are resistant to frost.

A disadvantage of this method is that setting up and lighting the sources of heat is very time-consuming.

Another disadvantage of this method is that, as the hot air rises, the heat sources usually spread their heat only to a limited extent in the lateral direction, as a result of which the energy consumption is very high and the efficiency of this method is very restricted.

According to another known method for avoiding frost damage, use is made of devices, either or not mobile, which heat the ambient air and blow the heated air over the crops, such that the temperature of the air where the crops are situated rises above the temperature limit above which the crops are frost resistant.

This known method is advantageous in comparison with the preceding one in that the produced heat is directed better towards the crops.

A disadvantage of this known method, however, is that the energy consumption is still very high.

Another disadvantage of this known method is that the devices are usually expensive and only offer a solution which is economically feasible for large surface cultivations.

Another disadvantage is that with this method, the device often has to be driven to and fro over the crops all night long.

According to yet another known method, use is made of wind turbines and helicopters.

This method can only be applied when there is what is called inversion of the temperature profile on the ground, whereby layers of air have a higher temperature at greater heights than layers of air at lower heights, which is just the opposite under normal conditions.

By means of the wind turbines and helicopters, one tries to mix the higher layers of air with the lower ones according to this known method, such that the temperature on the ground rises where the crops are situated.

A disadvantage of this known method is that such wind turbines or helicopters also consume much energy.

Another disadvantage of this known method is that it can only be applied in case of temperature inversion.

Another known method for avoiding frost damage in crops consists in sprinkling the crops.

As a result of the heat which is released during the phase change from the liquid phase to the solid phase of the water, the crops are protected against freezing.

However, a disadvantage of this method is that large amounts of water must be made available.

Another disadvantage of this method is that, in case of the slightest error in the water supply, the crops can be damaged very badly.

Another problem which is known in agriculture, in particular in fruit culture, and which is disadvantageous to the crop yield, is that when the temperature is too low, the fruit will not develop after the pollination, i.e. the fructification does not get started.

For this fructification, not only negative temperatures are very disadvantageous, but also periods in which what is called the temperature sum, i.e. the sum of the average day temperatures registered over this period, is too low.

For, when the temperatures are that low, the stamens may shrink, such that they no longer let the pollen through to reach the pistil, as a result of which there can be no pollination.

A good pollination requires a temperature of about 14° C.

Thus, it is possible to positively influence the growth process by adding heat.

Also, a known method consists in putting heat sources or smoke pots between the crops, just as to avoid frost damage, for example in order to make the temperature rise from 12° C. to 14° C. on the site of the crops.

Naturally, the same disadvantages occur in this case as well.

Another known method to improve the fructification consists in spraying a chemical product on the crops.

Such a chemical product may for example retard the blooming to a period in which the temperature sum is higher, which has a positive influence on the fructification.

A disadvantage of this method, however, is that also the harvest is retarded, which is often less favorable to the final selling price of the fruits.

According to another known method whereby use is made of a chemical product, the crops are sprayed with a growth inhibitor.

This causes a reaction whereby the blossom develops more strongly, as a result of which this blossom can absorb more light and heat, which again has a positive effect on the fructification.

A disadvantage of the latter known methods is that the application of chemical products is harmful to the environment and is more and more restricted by law.

An additional disadvantage of the use of chemical products is that they become more and more expensive.

Also, the present invention aims to remedy one or several of the above-mentioned and other disadvantages.

A further aim hereby is to obtain a simple and practically improved method which yields a heavier crop at low temperatures and whereby as little energy as possible is consumed.

The invention also aims to make such a method applicable to smaller fields of about 0.5 hectare, without obtaining uneconomical solutions.

To this end, the present invention concerns a method for avoiding frost damage in crops and/or for improving the fructification at low temperatures, which consists in periodically heating and cooling the air on the site of the crops between a minimum and a maximum temperature with a minimal temperature variation of 0.2° C.

For it has been established by experiment that in order to avoid frost damage, not necessarily the air on the site of the crops must be heated above the temperature limit at which, under static circumstances, in other words without applying the method of the invention, the crops are frost resistant, but that it is sufficient to expose the crops to a certain periodical temperature variation of at least 0.2° C.

An advantage of this method according to the invention is that an enormous amount of energy can be saved.

For, far less energy is required to obtain a temperature variation of at least 0.2° C. on the site of the crops, than to entirely heat the air on the site of the crops up to above the above-mentioned temperature limit and to constantly maintain it above this temperature.

Further, it has also been proven that a temperature variation of at least 0.2° C. analogously has a positive influence on the fructification.

Also for improving the fructification, this method according to the invention saves an enormous amount of energy.

For, instead of globally heating the ambient air on the site of the crops, for example, up to a temperature which is regarded as suitable for fructification, for example 14° C., one only has to expose the crops, according to the invention, to a temperature variation of at least 0.2° C. with an average temperature which is lower than the above-mentioned temperature which is regarded as being suitable, for example a temperature varying around 13° C. on average.

In other words, with such a method according to the invention is obtained a far better fructification, whereby far less energy is consumed than with the known methods.

According to a preferred method of the invention, the added heat is just sufficient to make sure that the smallest temperature variation on the site of the crops amounts to 0.2° C.

An advantage of this preferred method according to the invention is that the energy consumption is reduced to a minimum.

The present invention also concerns a device which can be applied with the above-mentioned method according to the invention.

The known devices which are applied with methods for avoiding night frost and for improving the fructification at low temperatures are usually very expensive, very complex and not suitable to be applied on smaller parcels of 0.5 ha to 2 ha.

Also, the present invention aims to provide a solution to one or several of the above-mentioned and other disadvantages of the known devices.

To this end, the present invention also concerns a device which can be applied with a method according to the invention as described above, whereby this device is provided with a blowing device with an inlet and an outlet and heating means to heat drawn-in ambient air and a control box provided with an algorithm for controlling the heating means to periodically heat and cool the air on the site of the crops between a minimum and a maximum temperature with a minimal temperature variation of 0.2° C.

An advantage of such a device according to the invention is that it can be made with very simple means, as a result of which its cost price is limited.

Moreover, the above-mentioned control box makes sure that the device consumes only a minimum amount of energy.

In order to better explain the characteristics of the invention, the following preferred methods for avoiding frost damage in crops and/or for improving the fructification at low temperatures are described as an example only without being limitative in any way, as well as some preferred embodiments of a device which can be applied with such a method, with reference to the accompanying drawings, in which:

FIG. 1 schematically represents a device according to the invention seen from above;

Figure 1:
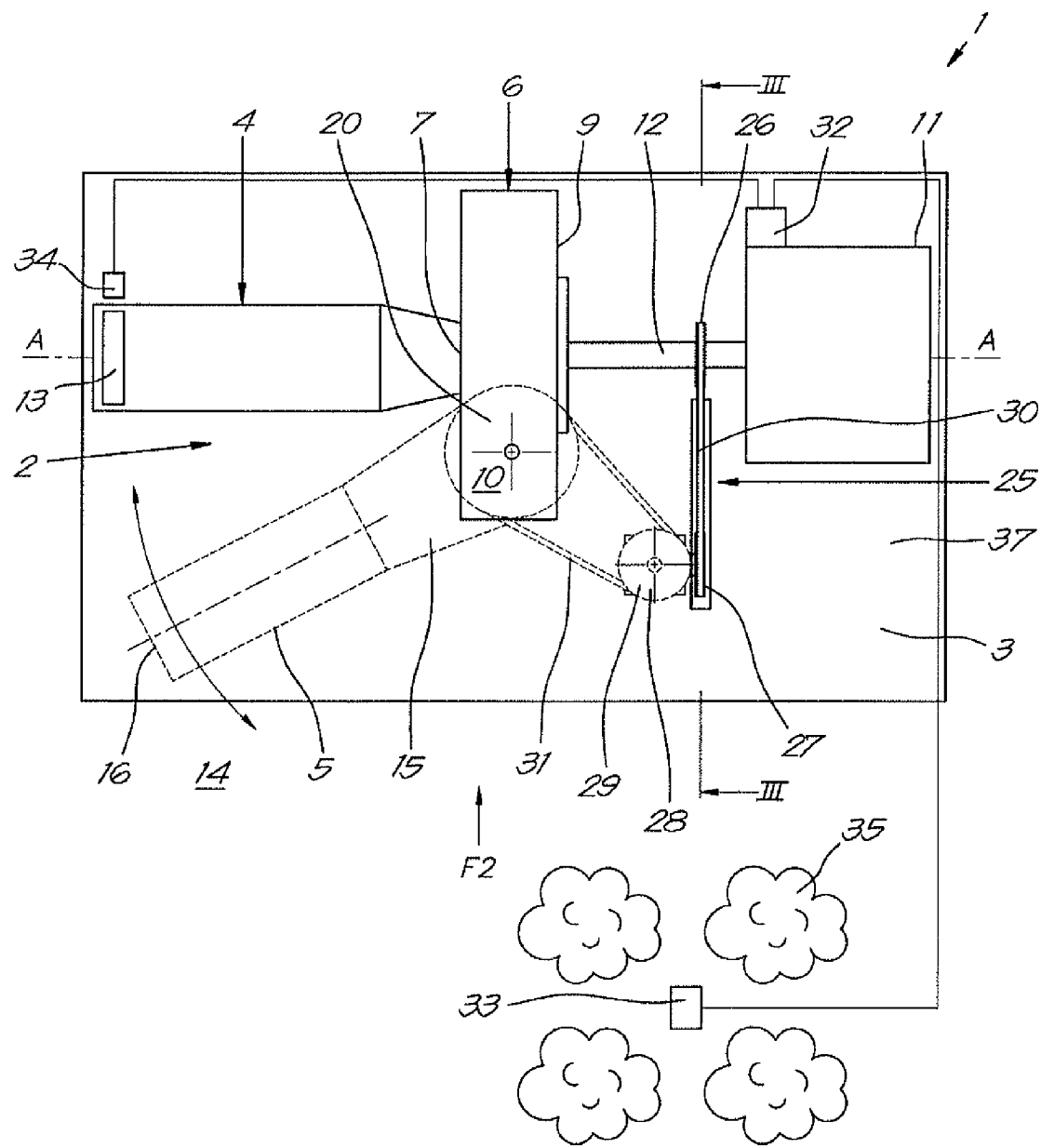
Figure 2:
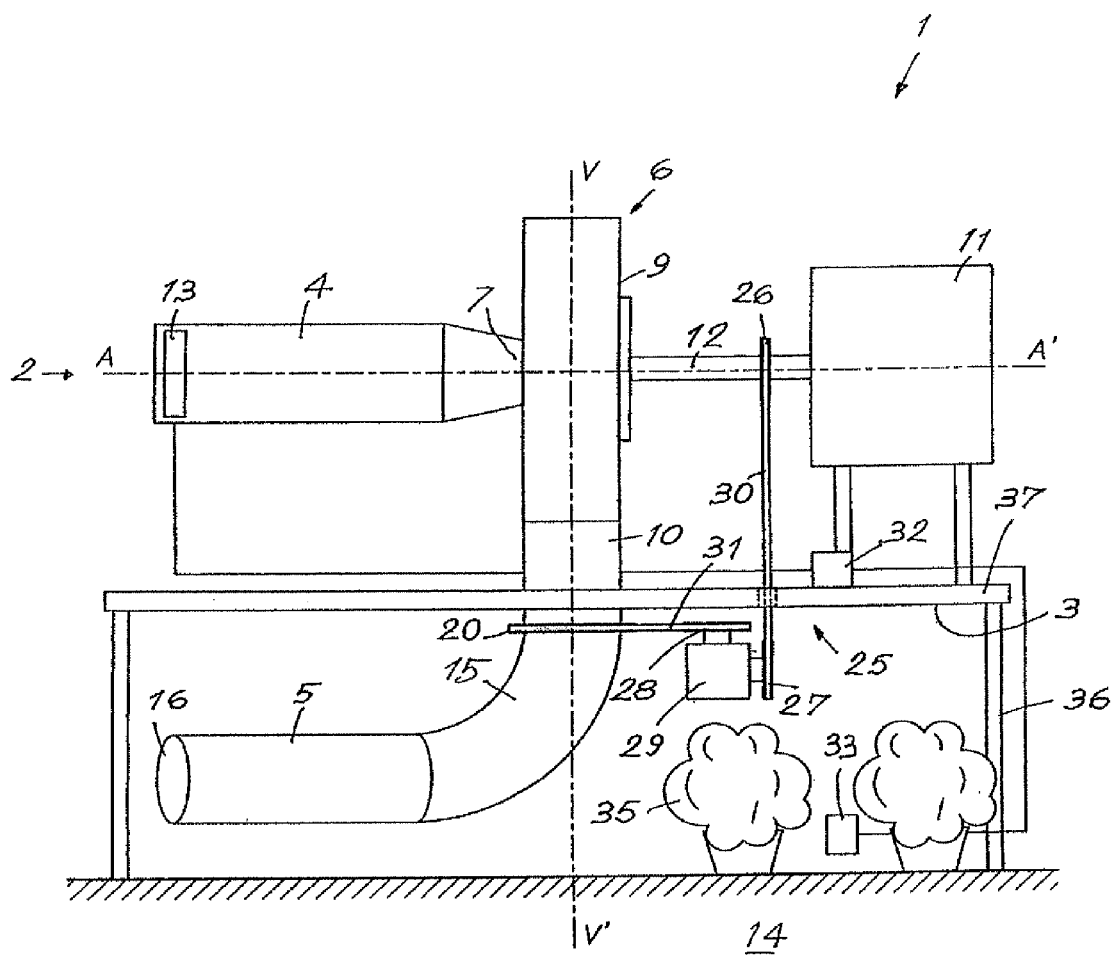
FIG. 2 shows a view according to arrow F2 in FIG. 1.
Figure 3:
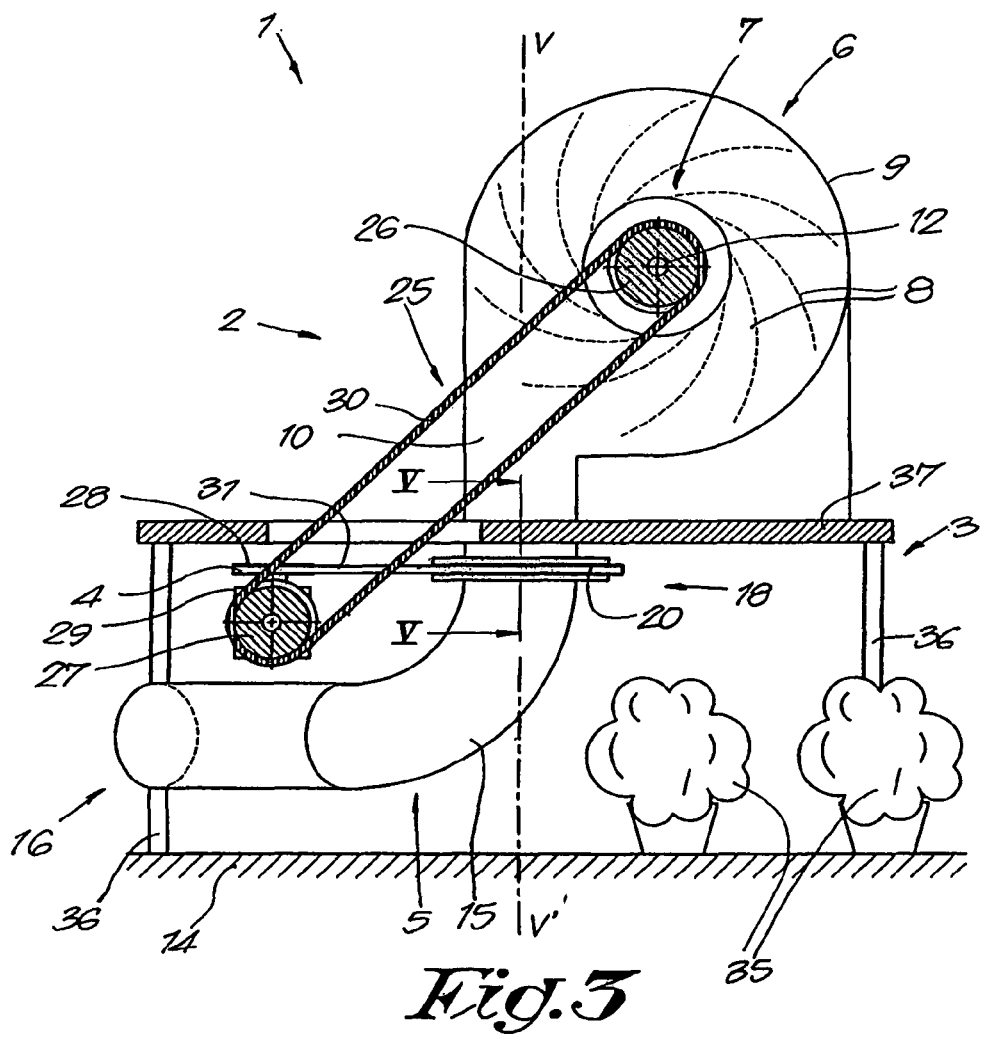
FIG. 3 is a section according to line III-III in FIG. 1.

The device 1 according to the invention represented in FIGS. 1 to 3 is provided with a blowing device 2 which is mounted on a support 3.

The blowing device 2 is formed of an inlet 4 and an outlet 5, in between which is provided a fan 6.

In this case, the fan 6 is a centrifugal fan with an axially directed input 7 at the height of the axis AA' of the rotor 8 of the fan 6, where air is drawn in via the inlet 4, and with an output 10, directed tangentially to the rotor housing 9 of the fan 6, where the air is blown out to the outlet 5.

Such a centrifugal fan 6 offers the advantage that a large air volume is moved at a relatively high speed and at a relatively high pressure.

The fan 6 is provided with driving means in the form of a motor 11, whose shaft 12 is coupled to the rotor 8 of the fan 6.

In the inlet 4 are provided heating means in the form of a burner 13 to heat the air which is drawn in by the fan 6.

In the given example, the inlet 4 is parallel to the bottom 14 and placed above the outlet 5.

The output 10 of the fan 6 is directed crosswise to the bottom 14.

The outlet 5, which is connected to this output 10 of the fan 6, is provided with an elbow 15 however, such that the far end 16 of this outlet 5 is directed parallel to the bottom 14 as well.

The outlet 5 is provided in a rotating manner on the output 10 of the fan 6.

Figure 4:
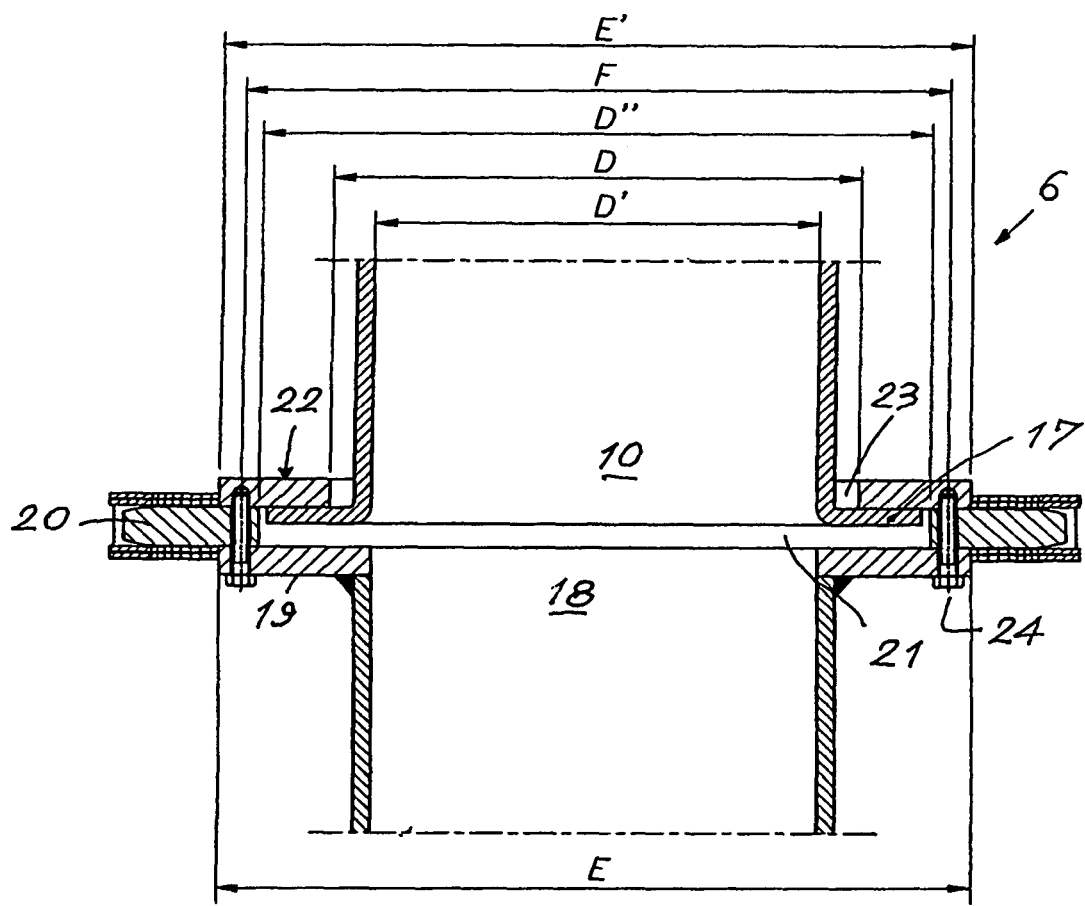
FIG. 4 represents a section according to line IV-IV in FIG. 3 to a larger scale.

As is represented more in detail in the section of FIG. 4, this is realized by providing the output 10 of the fan 6 with a collar 17, whereby the adjacent far end 18 of the outlet 5 surrounds this collar 17 in a loose manner.

In the given example of FIG. 4, said surrounding element consists of a collar 19 at the far end 18 of the outlet 5, onto which have been successively screwed a chain wheel 20 with a central opening 21 and a circular disk 22 with a central opening 23 by means of bolts 24.

The diameter D of the central opening 23 is hereby just somewhat larger than the outer diameter D' of the output 10 of the fan 6, such that there is sufficient play for a smooth rotation.

On the other hand, this diameter D is substantially smaller than the outer diameter D" of the collar 17 on said output 10, such that a sufficiently large supporting surface is obtained on the collar 17.

Further, the outer diameter E of the collar 19 on the outlet 5 is about equal to the outer diameter E' of the circular disk 22, whereby these diameters E and E' are substantially larger than the diameter D" of the collar 17, such that there is sufficient space to connect the outlet 5 and the circular disk 22 by means of the bolts 24.

The inner diameter F of the central opening in the chain wheel 20 is just slightly larger than the outer diameter E' of the collar 17, such that there is again enough play so as not to hinder the rotation of the outlet 5 in relation to the fan 6.

The rotational movement of the driving means 11 for driving the fan 6 is also transmitted to the outlet 5 of the device 1 via transmission means 25, so as to make the outlet 5 rotate round a vertical axis V-V'.

In the given example, these transmission means 25 consist of a chain wheel 26 on the shaft 12 of the motor 11, two chain wheels 27 and 28 which are provided on the shafts of a squared gear transmission 29, the above-mentioned chain wheel 20 on the outlet 5 and chains 30 and 31 provided between the chain wheels 26 and 27, and between the chain wheels 28 and 29 respectively.

By appropriately selecting the different diameters of the chain wheels 20, 26, 27 and 28, as well as the transmission ratio of the squared gear transmission 29, the fast rotation of the shaft 12 can be transformed in a desired slower rotation of the outlet 5.

Figure 5:
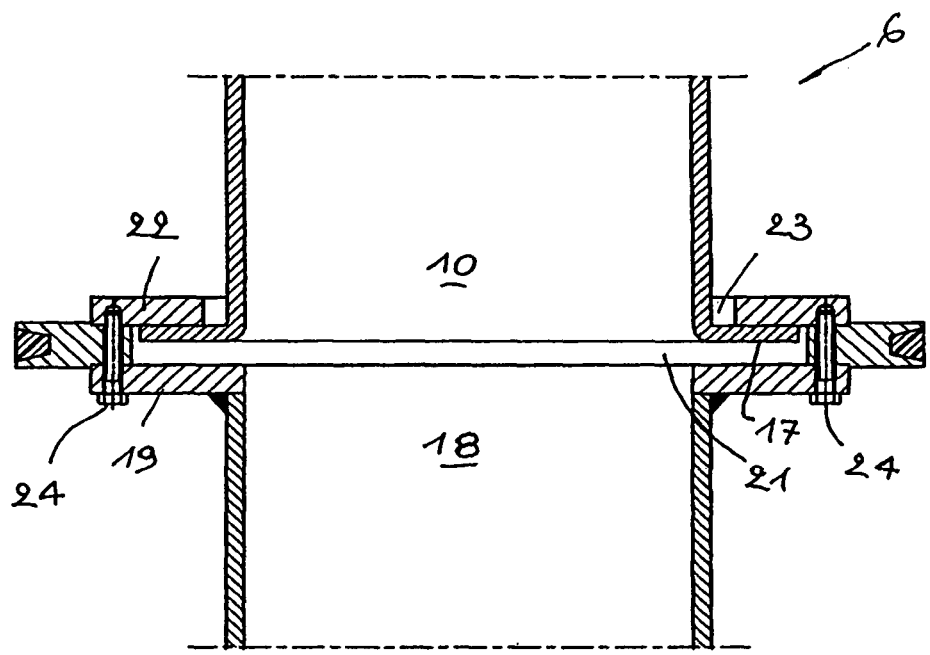
FIG. 5 represents an alternative embodiment of FIG. 4.

Of course, alternatively, it is also possible to replace the above-mentioned chain wheels 20, 26, 27 and 28 by pulleys and to replace the chains 30 and 31 by belts, as illustrated in FIG. 5.

The device 1 according to the invention preferably also comprises a control box 32 which is provided with an algorithm to control the heating means 13.

Even more preferably, a temperature sensor 33 is connected to the above-mentioned control box to measure a temperature which serves as the input for the above-mentioned algorithm.

Moreover, the control box 32 preferably controls the heating-up degree of the drawn-in air, for example by means of an electromechanical valve 34 which is provided for example in a fuel pipe of the heating means 13.

Alternatively or additionally, it is also possible according to the invention to control the rotational speed of the outlet 5 or the rotational speed of the fan 6 by means of the control box 32.

The above-described device 1 according to the invention can be applied with a method according to the invention for avoiding frost damage in crops 35 and/or for improving the fructification at low temperatures, as will be explained hereafter.

Such a method according to the invention consists in putting up a device 1 in a field, centrally between the crops 35, and in periodically heating up and cooling the air on the site of the crops 35 between a minimum and a maximum temperature with a minimal temperature variation of 0.2° C.

According to the invention, the period between the maximum and minimum temperature on the site of the crops 35 preferably lasts 10 minutes at the most.

Further, this period preferably lasts at least 4 minutes.

With the device 1 represented in FIGS. 1 to 3 is realized a heat supply on the site of the crops 35 by drawing in the cold ambient air by means of the fan 6; by heating the air with the burner 13 and by distributing the heated air over the crops 35 via the outlet 5.

As the outlet 5 is rotated round the vertical axis V-V' by means of the above-mentioned driving means 11 and transmission means 25, the air on the site of the crops 35 is periodically heated and cooled.

It is clear that every rotation of the outlet 5 corresponds to one above-mentioned period during which the temperature rises and drops between a maximum and minimum temperature.

In order to avoid for example frost damage to the crops 35, it is not necessary according to the invention to heat the air on the site of the crops 35 above the temperature at which the crops, under static circumstances, i.e. without applying the described method according to the invention, are resistant against frost.

For example, at least for a part of the period of the temperature variation, the temperature of the air on the site of the crops 35 can stay under the temperature limit, whereby the crops 35 are no longer frost resistant under static circumstances.

It is even possible that, for the whole period of the temperature variation, the temperature of the air on the site of the crops stays under the above-mentioned temperature limit, whereby the crops are no longer frost resistant under static circumstances.

Also, in order to improve the fructification of the crops, it is not necessary to heat up the air to the temperature which is deemed suitable for the fructification.

According to the invention, it is sufficient to that end to periodically heat and cool the temperature of the air between a minimum and a maximum temperature with a minimal temperature variation of 0.2° C.

For example, when the ambient air is −7° C. and it is known that the crops 35, when there is no intervention, already incur frost damage at −3° C., it is sufficient according to the invention to blow around hot air from the outlet 5 with the above-mentioned device 1, while the outlet 5 is being rotated, as long as it is made sure to provide for a periodical temperature variation on the site of the crops situated furthest away from the outlet 5 of at least 0.2° C.

According to the invention, it does not matter whether the average temperature around which this temperature variation is situated is taken above the above-mentioned −3° C.; on the contrary, it may already be sufficient if the average temperature is taken to −5° C. by the heating means 13 with a periodical temperature variation of 0.2° C. as a result of the rotation of the outlet 5.

It is clear that much energy can be saved with such a method.

According to a preferred method of the invention, the added heat is just sufficient to make sure that the smallest temperature variation on the site of the crops amounts to 0.2° C., such as for example in the places furthest away from the device 1.

Of course, as it gets colder, more heat has to be blown to the crops 35 via the outlet 5 in order to register a temperature variation of 0.2° C. on the site of the crops 35 situated furthest away from the device 1.

By equipping the device 1 with a control box 32, the heating degree of the ambient air on the site of the burner 13 can be controlled for example as a function of the temperature of the air which is measured on the site of the crops 35 situated furthest away by means of a temperature sensor 33, for example by supplying more or less fuel to the burner 13 by means of the valve 34.

Typically, the temperature at the outlet 5, depending on the circumstances, is situated between 50° C. and 130° C.

The device 1 according to the invention is typically designed for fields of some 0.5 ha or for a surface within a radius of some 40 m.

Naturally, it possible to spread several such devices 1 over a field with a larger surface according to a regular pattern to avoid for example frost damage to the crops 35.

One must hereby take care, according to the invention, to realize a periodical temperature variation of at least 0.2° C. on the places situated furthest away from a device 1.

In the embodiment of a device 1 according to the invention considered up to now, the inlet 4 is situated above the outlet 5.

Figure 6:
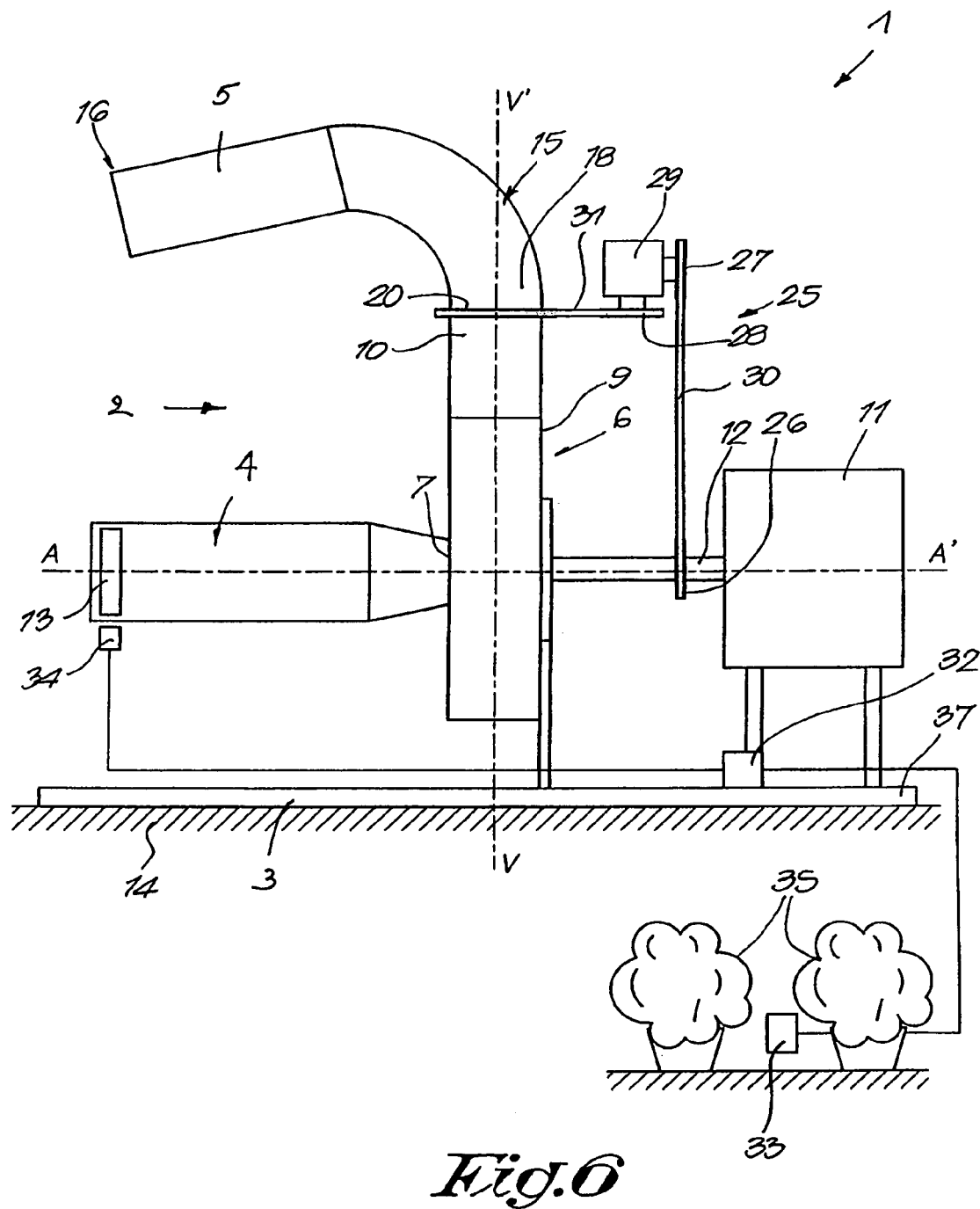
FIG. 6 represents a view as in FIG. 2 for an alternative embodiment of a device according to the invention.

In another embodiment which is represented in FIG. 6, the inlet 4 is placed under the outlet 5 however, whereby the outlet 5 is directed somewhat towards the bottom 14.

The support must not always be provided with legs 36 either, but it may be for example a flat plate 37 which is placed directly on the bottom 14, such that a larger bearing surface is obtained.

Many other embodiments of a device 1 for avoiding frost damage or for improving the fructification are possible according to the invention.

For example, it is possible to realize a temperature variation on the site of the crops 35 by subjecting the outlet to a rocking to-and-fro movement instead of making the outlet 5 rotate over an entire perimeter.

It is also possible to put a device 1 on a mobile support, such that the device 1 can be easily moved.

Further, it is not excluded to apply for example an electric heating instead of heating means 13 in the form of a burner 13.

Such an electric heating could for example also be distributed very evenly in the field.

By switching this electric heating on and off, for example by means of the above-mentioned control box 32, a temperature variation of at least 0.2° C. could be realized on the site of the crops.

The present invention is by no means restricted to the methods for avoiding frost damage in crops and/or for improving the fructification at low temperatures described as an example, nor to the embodiments of a device which can be applied with such a method given as an example and represented in the accompanying drawings; on the contrary, such a method and device according to the invention can be made in all sorts of variants while still remaining within the scope of the invention.

The invention claimed is:

1. Method for avoiding frost damage in crops and improving the fructification at low temperatures, comprising periodically heating and cooling the air at the site of the crops with a minimal temperature variation of 0.2° C. and wherein the heat is supplied by drawing in the ambient air, heating the drawn-in air and distributing the heated air over the crops; and wherein, in order to avoid frost damage, during the entire period of the temperature variation, the temperature of the air at the site of the crops stays under the temperature at which the crops are no longer frost resistant in the absence of the aforesaid steps; and/or wherein, in order to improve fructification, during the entire period of the temperature variation, the temperature of the air at the site of the cross stays under the temperature which is deemed suitable for fructification of the crops in the absence of the aforesaid steps.

2. Method according to claim 1, wherein the heat is just sufficient to ensure that the smallest temperature variation at the site of the crops is 0.2° C.

3. Method according to claim 1, wherein the period temperature variation at the site of the crops lasts 10 minutes at the most.

4. Method according to claim 1, wherein the period temperature variation at the site of the crops lasts at least 4 minutes.

5. Method according to claim 1, wherein in order to distribute the hot air over the crops, a fan is provided, having an inlet and an outlet, and wherein the air is periodically heated and cooled by rotating the outlet.

6. Method according to claim 5, wherein the outlet extends mainly parallel to the ground.

7. Method according to claim 6, wherein the outlet rotates round a vertical axis.

* * * * *